United States Patent
Voss et al.

(10) Patent No.: US 12,425,361 B2
(45) Date of Patent: *Sep. 23, 2025

(54) PROVIDING REDUCED AVAILABILITY MODES IN MESSAGING

(71) Applicant: Snap Inc., Santa Monica, CA (US)

(72) Inventors: Jeremy Voss, Los Angeles, CA (US); Christie Marie Heikkinen, Sherman Oaks, CA (US); Daniel Rakhamimov, Brooklyn, NY (US); Laurent Desserrey, Los Angeles, CA (US); Susan Marie Territo, Los Angeles, CA (US); Edward Koai, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/583,202

(22) Filed: Feb. 21, 2024

(65) Prior Publication Data
US 2024/0195763 A1 Jun. 13, 2024

Related U.S. Application Data

(63) Continuation of application No. 16/729,629, filed on Dec. 30, 2019, now Pat. No. 11,968,157.

(51) Int. Cl.
*H04L 51/043* (2022.01)
*H04L 51/224* (2022.01)
*H04L 51/52* (2022.01)

(52) U.S. Cl.
CPC .......... *H04L 51/043* (2013.01); *H04L 51/224* (2022.05); *H04L 51/52* (2022.05)

(58) Field of Classification Search
CPC ..... H04L 51/043; H04L 51/224; H04L 51/52; H04L 67/24; H04L 51/34
(Continued)

(56) References Cited

U.S. PATENT DOCUMENTS

| 9,021,031 B1 | 4/2015 | Jansson |
| 9,729,649 B1 | 8/2017 | Beguin |

(Continued)

OTHER PUBLICATIONS

"U.S. Appl. No. 16/729,629, Examiner Interview Summary mailed Jan. 24, 2023", 2 pgs.
(Continued)

*Primary Examiner* — Suraj M Joshi
*Assistant Examiner* — Ayele F Woldemariam
(74) *Attorney, Agent, or Firm* — Schwegman Lundberg & Woessner, P.A.

(57) ABSTRACT

Aspects of the present disclosure involve a system comprising a computer-readable storage medium storing a program and method for providing reduced availability modes in messaging. The program and method provide for maintaining a count of consecutive time periods in which message content has been exchanged between a first user and a second user in a messaging application; receiving, from a device associated with the first user, a request to set an availability mode for the first user to a reduced availability mode with respect to the messaging application; setting, in response to receiving the request, the availability mode for the first user to the reduced availability mode; and refraining from updating the count while the availability mode is set to the reduced availability mode.

20 Claims, 16 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2004/0117443 A1 | 6/2004 | Barsness | |
| 2006/0075351 A1 | 4/2006 | Brumfield | |
| 2008/0243789 A1 | 10/2008 | Kussmaul et al. | |
| 2008/0250109 A1* | 10/2008 | Jakobson | G06Q 30/04 709/206 |
| 2009/0049168 A1* | 2/2009 | Galvin | H04L 51/04 709/224 |
| 2013/0229337 A1* | 9/2013 | Andou | G06F 1/3231 345/156 |
| 2015/0373198 A1* | 12/2015 | Ruetschi | H04M 3/543 379/211.01 |
| 2016/0110467 A1 | 4/2016 | Hern | |
| 2018/0349499 A1* | 12/2018 | Pawar | G06F 16/9536 |
| 2019/0280993 A1* | 9/2019 | Queva | G16H 20/70 |

OTHER PUBLICATIONS

"U.S. Appl. No. 16/729,629, Final Office Action mailed Nov. 3, 2022", 9 pgs.

"U.S. Appl. No. 16/729,629, Final Office Action mailed Nov. 12, 2021", 9 pgs.

"U.S. Appl. No. 16/729,629, Non Final Office Action mailed Mar. 24, 2022", 9 pgs.

"U.S. Appl. No. 16/729,629, Non Final Office Action mailed Mar. 25, 2021", 9 pgs.

"U.S. Appl. No. 16/729,629, Non Final Office Action mailed May 11, 2023", 9 pgs.

"U.S. Appl. No. 16/729,629, Notice of Allowance mailed Dec. 13, 2023", 8 pgs.

"U.S. Appl. No. 16/729,629, Response filed Jan. 18, 2023 to Final Office Action mailed Nov. 3, 2022", 8 pgs.

"U.S. Appl. No. 16/729,629, Response filed Feb. 8, 2022 to Final Office Action mailed Nov. 12, 2021", 7 pgs.

"U.S. Appl. No. 16/729,629, Response filed Jul. 22, 2022 to Non Final Office Action mailed Mar. 24, 2022", 8 pgs.

"U.S. Appl. No. 16/729,629, Response filed Jul. 26, 2021 to Non Final Office Action mailed Mar. 25, 2021", 8 pgs.

"U.S. Appl. No. 16/729,629, Response filed Aug. 10, 2023 to Non Final Office Action mailed May 11, 2023", 10 pgs.

* cited by examiner

PROVIDING REDUCED AVAILABILITY MODES IN MESSAGING

CROSS-REFERENCE TO RELATED APPLICATION

This application is a continuation of U.S. patent application Ser. No. 16/729,629, filed Dec. 30, 2019, which is incorporated by reference herein in its entirety.

TECHNICAL FIELD

The present disclosure relates generally to messaging systems, including configuring messaging systems to provide reduced availability modes in messaging.

BACKGROUND

Messaging systems provide for the exchange of message content between users. For example, a messaging system allows a user to exchange message content with one or more other users in a message thread.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A messaging system typically allow users to exchange content items (e.g., messages, images and/or video) with one another in a message thread. A messaging system may work in conjunction with a social network system which is configured to maintain the identity of users and their corresponding relationships (e.g., friend relationships).

The messaging system as described herein implements a counter that maintains a running count of consecutive time periods (e.g., consecutive days) that message content (e.g., media content) is exchanged between a first and second user. This count is displayed on respective devices of the first and second users while using the messaging application. If a day is missed, the count is typically reset. However, there are periods of time during which a user is less likely to engage in messaging. For example, the first user may be participating in an activity (e.g., traveling, working, studying, driving, relaxing, exercising) that typically results in a delayed, infrequent or no messaging. The disclosed embodiments provide for users to participate in such activities, without necessarily feeling distracted and/or compelled to message in order to maintain the back-and-forth message count.

The disclosed embodiments relate to a messaging system that provides a user interface with a user-selectable option to set reduced availability modes. For example, the reduced availability modes include a limited availability mode during which the user is likely to be slow or infrequent in messaging. The reduced availability modes also include an unavailable mode, with a user-selected time period during which the user is unavailable and unlikely to engage in messaging. In a case where a user selects either of the reduced availability modes, the messaging system provides for pausing the counter so as not to be reset, and for providing notifications to contacts (e.g., friends) of the user indicating the reduced availability. Moreover, in a case where the user sets the unavailable mode with specified time period, the messaging system provides for persistent notification(s) to appear on that user's device during the time period, for example, to continually remind the user that the unavailable mode is enabled.

Figure 1:
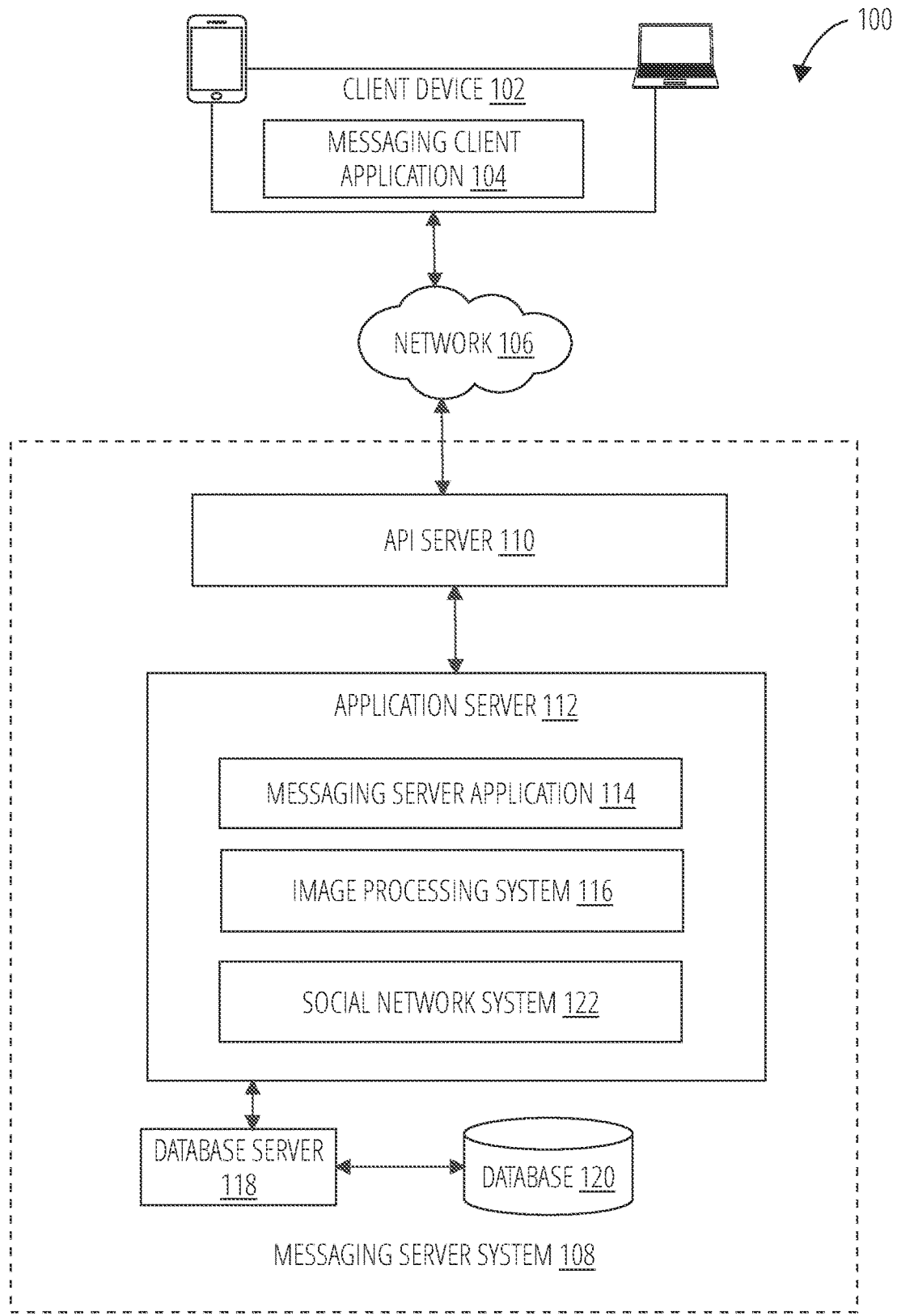
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between the messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., "Story"), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called "Stories" or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
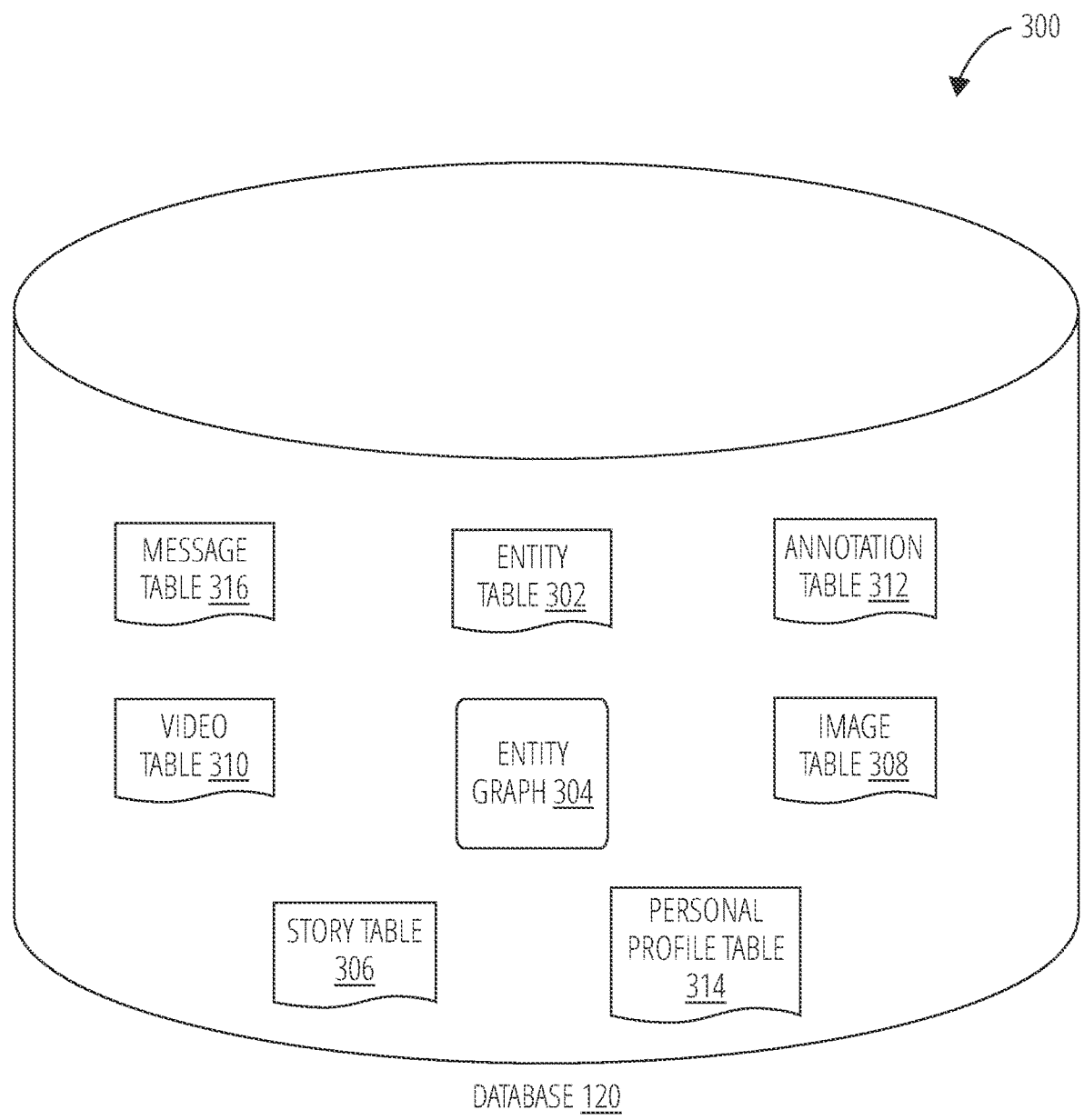
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user. Such other users may be referred to as the user's friends. In some embodiments, the social network system 122 may access location information associated with each of the user's friends to determine where they live or are currently located geographically.

Figure 2:
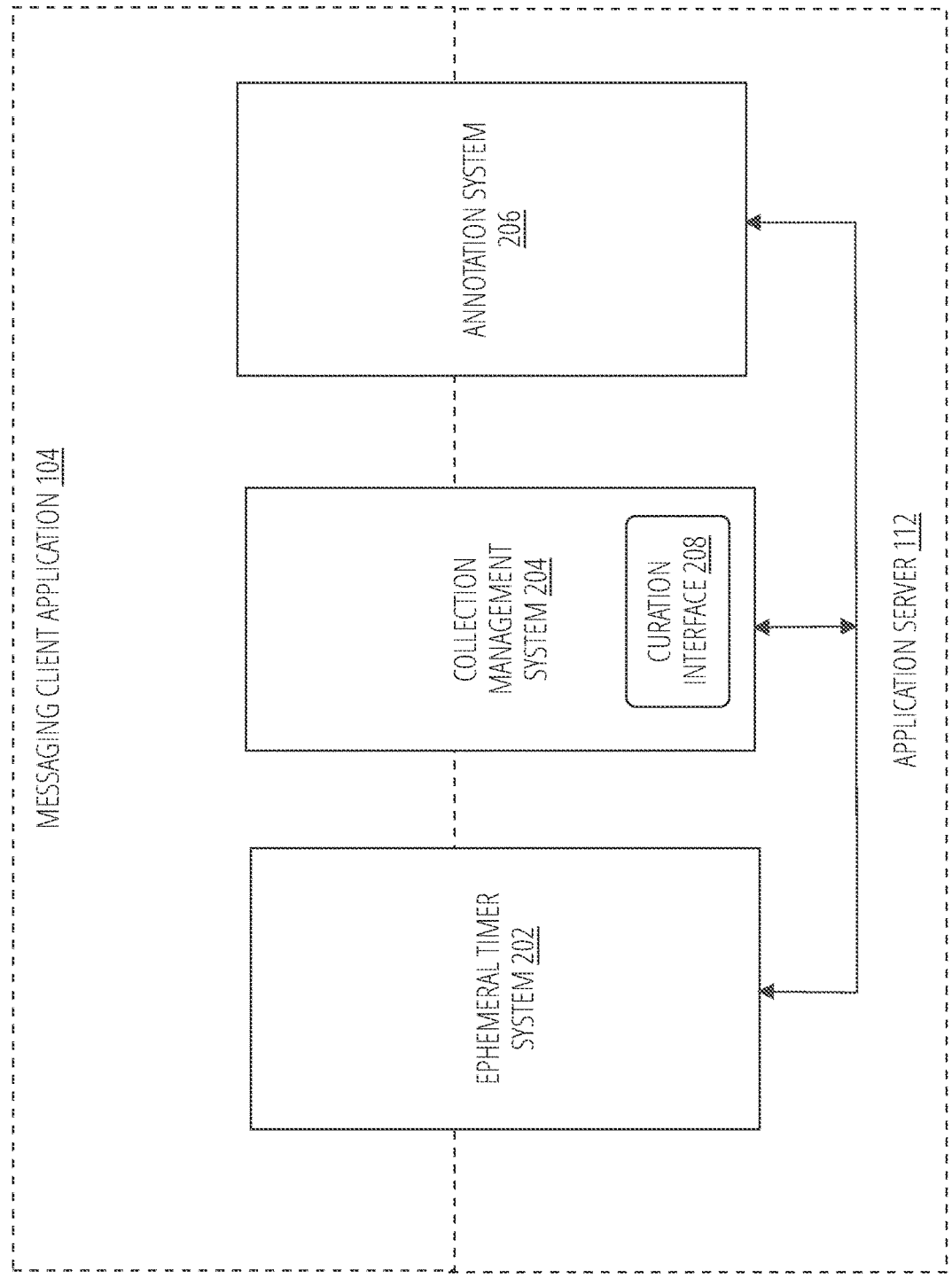
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 316. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 316. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for which a record is maintained in the entity table 302). A user may create a "personal Story" in the form of a collection of content that has been created and sent/broadcast by that user. To this end, the user interface of the messaging client application 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client application 104, to contribute content to a particular live Story. The live Story may be identified to the user by the messaging client application 104, based on his or her location. The end result is a "live Story" told from a community perspective.

A further type of content collection is known as a "location Story", which enables a user whose client device 102 is located within a specific geographic location (e.g., on a college or university campus) to contribute to a particular collection. In some embodiments, a contribution to a location Story may require a second degree of authentication to verify that the end user belongs to a specific organization or other entity (e.g., is a student on the university campus).

A personal profile table 314 stores data regarding a personal profile, which stores information specific to a given user. For the given user, the personal profile may indicate a list of contacts (e.g., friends), a geolocation of the user and/or content collections (e.g., Stories) associated with the user. Moreover, the personal profile table 314 stores account settings for the user, such as an avatar (e.g., bitmoji) representing the user and/or whether the user's geolocation is shared with other users. The account settings may be updated by the user.

Figure 4:
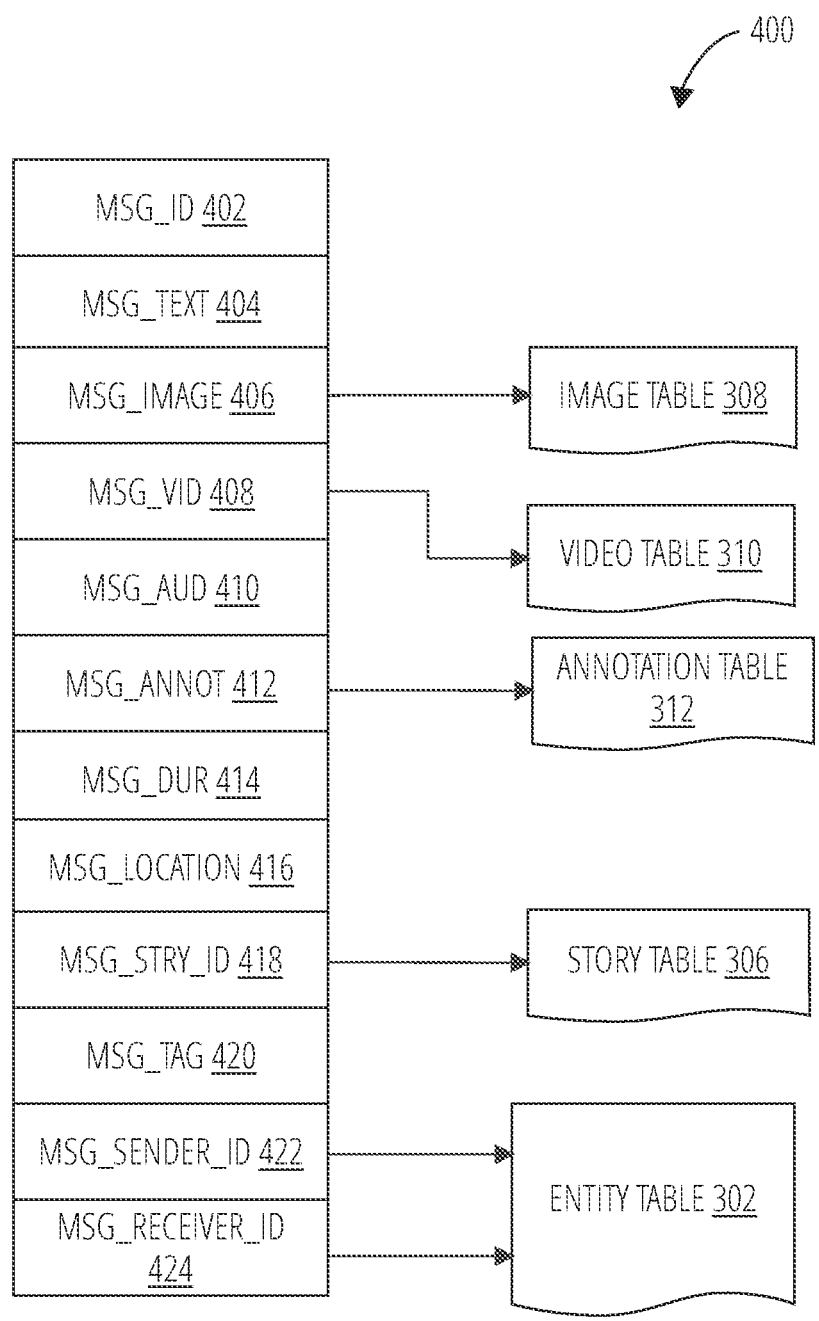
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 316 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

Message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "Stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
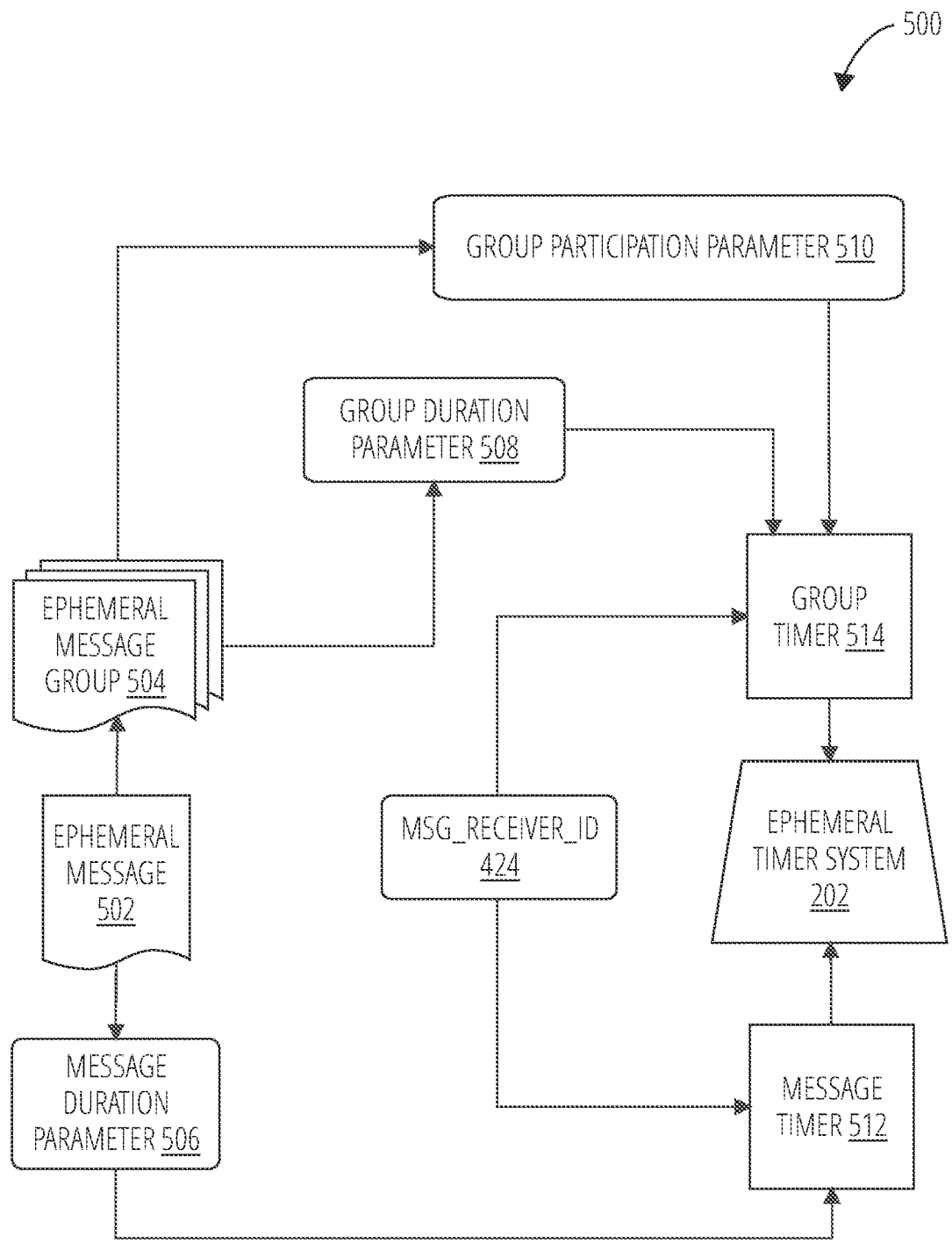
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal Story, or an event Story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514 which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
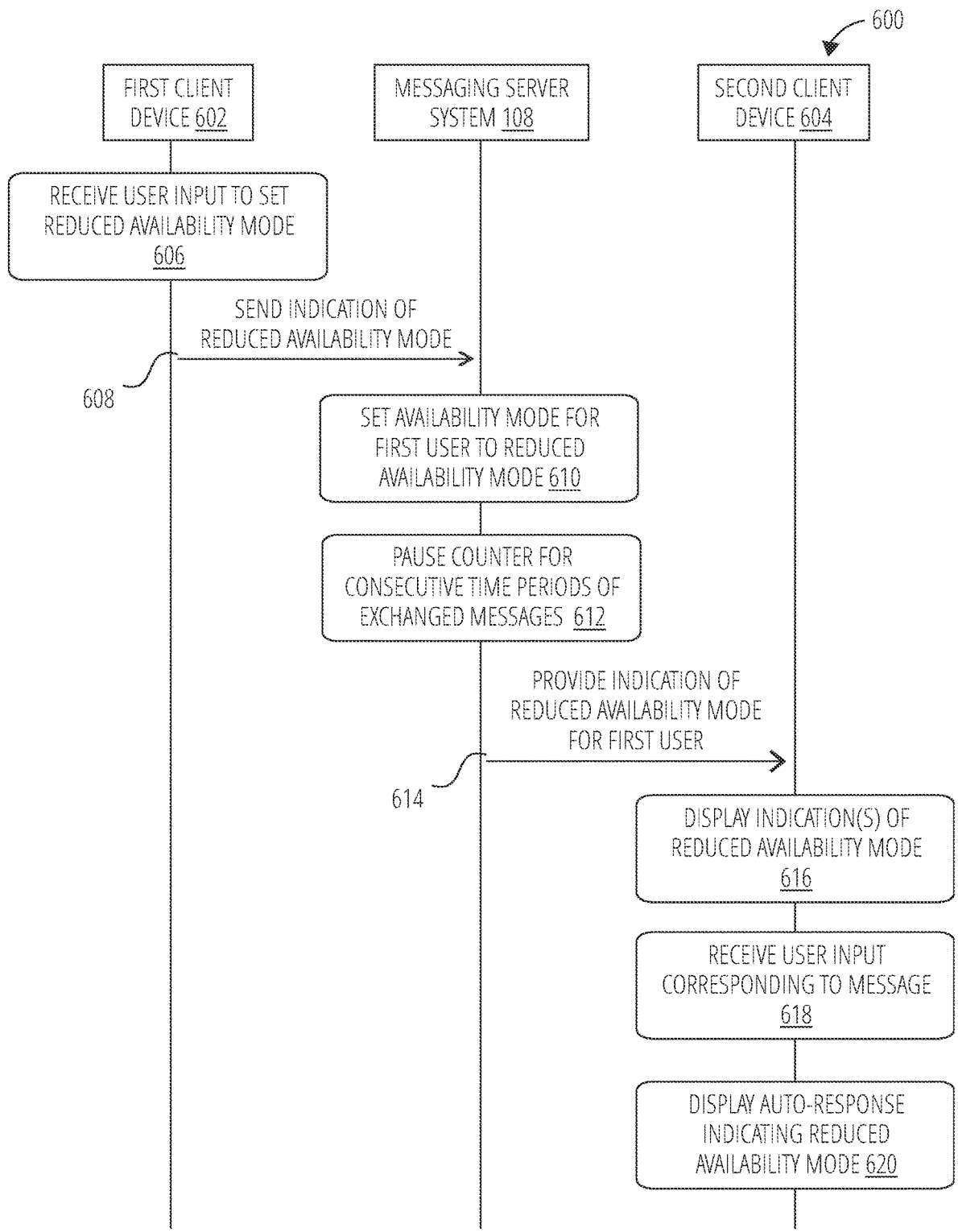
FIG. 6 is an interaction diagram illustrating a process for providing reduced availability modes in messaging, in accordance with some example embodiments.

FIG. 6 is an interaction diagram illustrating a process 600 for providing reduced availability modes in messaging, in accordance with some example embodiments. For explanatory purposes, the process 600 is primarily described herein with reference to a first client device 602 and a second client device 604 (e.g., each of which may correspond to a respective client device 102), and with reference to the messaging server system 108. However, the process 600 is not limited to the first client device 602, the second client device 604 and the messaging server system 108. Moreover, one or more blocks (or operations) of the process 600 may be performed by one or more other components of the first client device 602, the second client device 604 or the messaging server system 108, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

Each of the first client device 602 and the second client device 604 have instances of the messaging client application 104 installed thereon. In the example of FIG. 6, the first client device 602 and the second client device 604 are associated with a respective first user and second user of the messaging server system 108. For example, the first user may be associated with a first user account of the messaging server system 108, and the second user may be associated with a second user account of the messaging server system 108.

As noted above, the first and second users are identified by the messaging server system 108 based on unique identifiers (e.g., a messaging system identifier, email address and/or a device identifier) associated with respective user accounts for the first and second users. In addition, the messaging server system 108 implements and/or works in conjunction with a social network system 122 which is configured to identify other users (e.g., friends) with which a particular user has relationships. For example, the first user and the second user may be friends with respect to the messaging server system 108.

As noted above, the messaging server system 108 implements a counter that maintains a running count of consecutive time periods (e.g., consecutive days) that message content is exchanged between the first user and the second user. For example, the messaging server system 108 is configured to increment the counter each day of at least one back-and-forth message (e.g., with at least one media content item being sent from the first user to the second user, and at least one media content item being sent from the second user to the first user). If a day is missed, the messaging server system 108 is configured to reset the counter with respect to the first and second users. Moreover, the messaging server system 108 provides for the current count to be displayed within one or more interfaces of the messaging client application 104. In this manner, the first and/or second users may be encouraged to continue back-and-forth message (e.g., media content item) exchange on a daily basis.

However, there may be periods of time during which the first user and/or the second user are less likely to use the messaging client application 104, thereby reducing their availability to maintain the consecutive back-and-forth message count (e.g., or "streak"). For example, the first user may be participating in an activity (e.g., traveling, working, studying, driving, relaxing, exercising) that typically results in a delayed, infrequent or no replies. As described herein, the messaging server system 108 provides for pausing the counter in a case where a given user indicates reduced ability to interact with the messaging client application 104.

At block 606, the first client device 602 receives user input from the first user to set a reduced availability mode for the first user. In some embodiments, the messaging client application 104 in conjunction with the messaging server system 108 provides for the first user to set different reduced availability modes, thereby indicating that they expect to be slow, infrequent, or unable, to reply with respect to the messaging client application 104. For example, one type of reduced availability mode is a limited availability mode, in which the user expects to be slower and/or less responsive than usual with respect to messaging. Another type of reduced availability mode is an unavailable mode, in which the user expects to be unable (or unavailable) for a period of time.

The messaging client application 104 running on the first client device 602 provides one or more user interface(s) for the first user to set the reduced availability mode, including the type of reduced availability. As noted above, the messaging server system 108 provides for maintaining a personal profile with user-selectable account settings. In some embodiments, the messaging client application 104 includes a personal profile interface (e.g., discussed further below with respect to FIG. 7), configured to receive user input from a user (e.g., the first user) to set the reduced availability mode. Regarding the unavailable mode, the messaging client application 104 in some embodiments provides for the first user to specify a duration (e.g., time period) for the unavailable mode.

At operation 608, the first client device 602 sends an indication of the reduced availability mode to the messaging server system 108 (operation 608), where the reduced availability mode indicates the limited availability mode or the unavailable mode (e.g., including a duration value). In some embodiments, the messaging server system 108 is configured to automatically disable (turn off) the unavailable mode as set by the first user after the specified duration, such that the availability of the user returns to a normal mode of availability.

At block 610, the messaging server system 108 sets the availability mode for the first user to the reduced availability mode. For example, the messaging server system 108 updates the personal profile of the first user, via the personal profile table 314, to indicate that the first user is operating in a reduced availability mode. Moreover, in response to receiving the indication of the reduced availability mode (e.g., either of the limited availability mode or the unavailable mode), the messaging server system 108 pauses the counter configured to track consecutive time periods of back-and-forth messaging (block 612). By virtue of pausing the counter, the messaging server system 108 does not reset or otherwise adjust the count while the reduced availability mode is set, thereby maintaining the current count value. In this manner, the first user may participate in certain activities (e.g., traveling, working, studying, driving, relaxing, exercising) typically associated with delayed and no replies, without necessarily feeling distracted and/or compelled to message in order to maintain the back-and-forth message count.

The messaging server system 108 provides an indication of the reduced availability mode to the second client device 604 (operation 614). In response, the messaging client application 104 running on the second client device 604 displays one or more indications of the reduced availability mode (block 616). By displaying the indication(s), the messaging client application 104 running on the second client device 604 may inform the second user of the first user's reduced availability.

The messaging client application 104 is configured to display the indication of the reduced availability mode within different user interfaces. For example, the messaging client application 104 displays a notification of the reduced availability mode (e.g., limited availability and/or unavailability) for the first user within a message thread interface (e.g., as discussed below with respect to FIG. 8 and FIG. 10), where a message thread interface presents message content (e.g., messages, image, video and/or audio) exchanged between the first user and the second user within a message thread.

In another example, the messaging client application 104 displays the indication of the reduced availability (e.g., limited availability and/or unavailability) for the first user within a friends feed interface (e.g., as discussed below with respect to FIG. 9). For example, the friends feed interface includes a friends list with a name, avatar (e.g., bitmoji) and status (e.g., availability of a message and/or media content items) for each listed friend. In some embodiments, the messaging client application 104 on the second client device 604 further displays indication of the paused (e.g., or frozen) counter with respect to the first user.

In some embodiments regarding the unavailable mode, the messaging server system 108 provides a persistent notification to the first client device 602, for causing the first client device 602 to display an indication of the unavailable mode on a device lock screen (e.g., and refrain from providing other push notifications associated with the messaging system 100 to the device lock screen). Moreover, after the duration of time specified by the first user for the unavailable mode has passed, the messaging server system 108 is configured to discontinue the persistent notification for the lock screen on the first device, and/or provide update(s) to the second client device 604 for causing the messaging client application 104 on the second device to remove displayed indication(s) of the unavailable mode with respect to the first user.

The second client device 604 receives user input corresponding to message content provided by the second user, for sending to the first client device 602 (block 618). For example, the second user may have submitted the message content for sending to the first user at the first client device 602, regardless of the indication of reduced availability of the first user provided on the second client device 604.

In response, the messaging client application 104 running on the second client device 604 provides an automatically-generated response (or "auto-response") within the message thread displayed to the second user (block 620). The auto-response indicates the reduced availability mode (e.g., as discussed below with respect to FIG. 8 and FIG. 10). Moreover, the second client device 604 sends the message content to the messaging server system 108 (not shown), for transmission to the first client device 602.

Although FIG. 6 is described herein with respect to messaging between the first and second user, the subject system is not limited to two users. Thus, the blocks and operations for the process 600 may be applied to a group of users larger than two. For example, the messaging server system 108 is configured to send respective indications of reduced availability of the first user to multiple contacts (e.g., friends) of the first user. The messaging client application 104 running on respective devices of the multiple friends indicates the reduced availability for the first user. In another example, for a given end user on a device, the messaging server system 108 is configured to provide multiple indications of the reduced availability mode (e.g., limited availability and/or unavailable modes) as set by multiple respective friends, for display on the device.

Thus, the messaging system 100 as described herein provides at least in part for a user-selectable option to set one or more reduced availability modes (e.g., including a limited availability mode and/or an unavailable mode) in conjunction with pausing the counter for consecutive back-and-forth messaging. As such, an end user may participate in certain activities (e.g., traveling, working, studying, driving, relaxing, exercising) without necessarily feeling distracted and/or compelled to message in order to maintain the back-and-forth message count.

Figure 7:
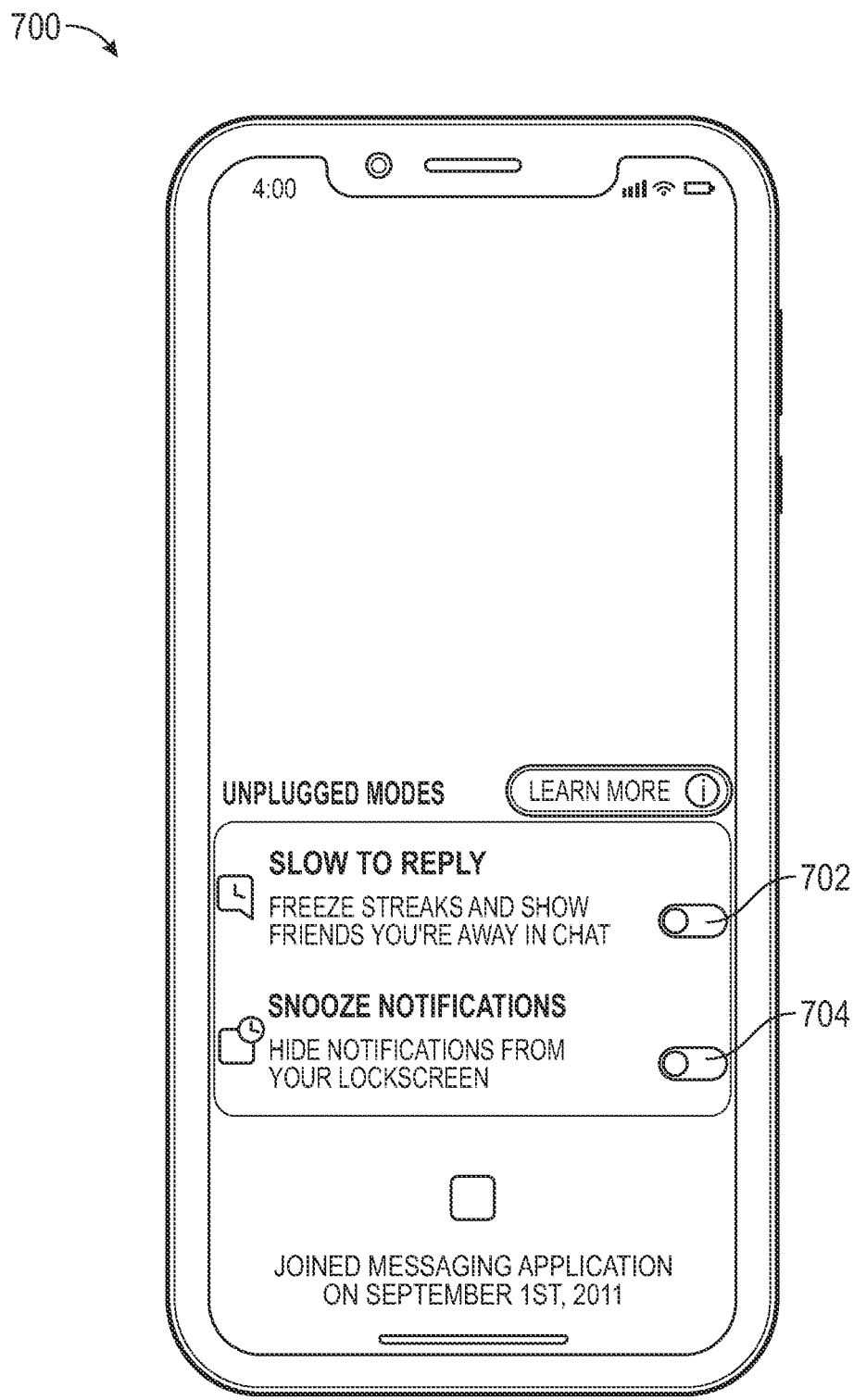
FIG. 7 illustrates a personal profile interface for setting reduced availability modes, in accordance with some example embodiments.

FIG. 7 illustrates a personal profile interface 700 for setting reduced availability modes, in accordance with some example embodiments. As noted above with respect to FIG. 6, the messaging client application 104 may provide the personal profile interface, which includes user-selectable options for updating account settings corresponding to a personal profile.

For example, the personal profile interface 700 includes a limited availability mode element 702 and an unavailable mode element 704 which correspond to different types of the reduced availability modes described herein. The limited availability mode element 702 as provided by the messaging client application 104 allows for a user (e.g., the first user) to enable and/or disable the limited availability mode. As noted above, enabling the limited availability mode provides for the messaging server system 108 to pause the counter and/or to send indication(s) to devices of other users (e.g., friends, such as the second user) that the first user may be slow or infrequent in messaging (e.g., of media content items). On the other hand, disabling the limited availability mode provides for the messaging server system 108 to resume the counter from the prior count value for consecutive time periods of back-and-forth messaging. In addition, disabling the limited availability mode provides for the messaging server system 108 to send an update to devices of the other users, for causing the other devices to no longer display the indications of the limited availability mode.

Moreover, the unavailable mode element 704 as provided by the messaging client application 104 allows for a user (e.g., the first user) to enable and/or disable the unavailable mode. As noted above, enabling the unavailable mode provides for the messaging server system 108 to pause the counter, send indication(s) to devices of other users (e.g., friends, such as the second user) that the first user is unavailable (e.g., unable or unlikely to reply) and/or provide persistent notification(s) on the first client device 602 (e.g., on a device lock screen) regarding the unavailable mode. On the other hand, disabling the unavailable mode provides for the messaging server system 108 to resume (e.g., re-enable) the counter. In addition, disabling the unavailable mode provides for the messaging server system 108 to send an update to devices of the other users, for causing the other devices to no longer display the indications of the unavailable mode, and for discontinuing the associated persistent notification(s).

Figure 8:
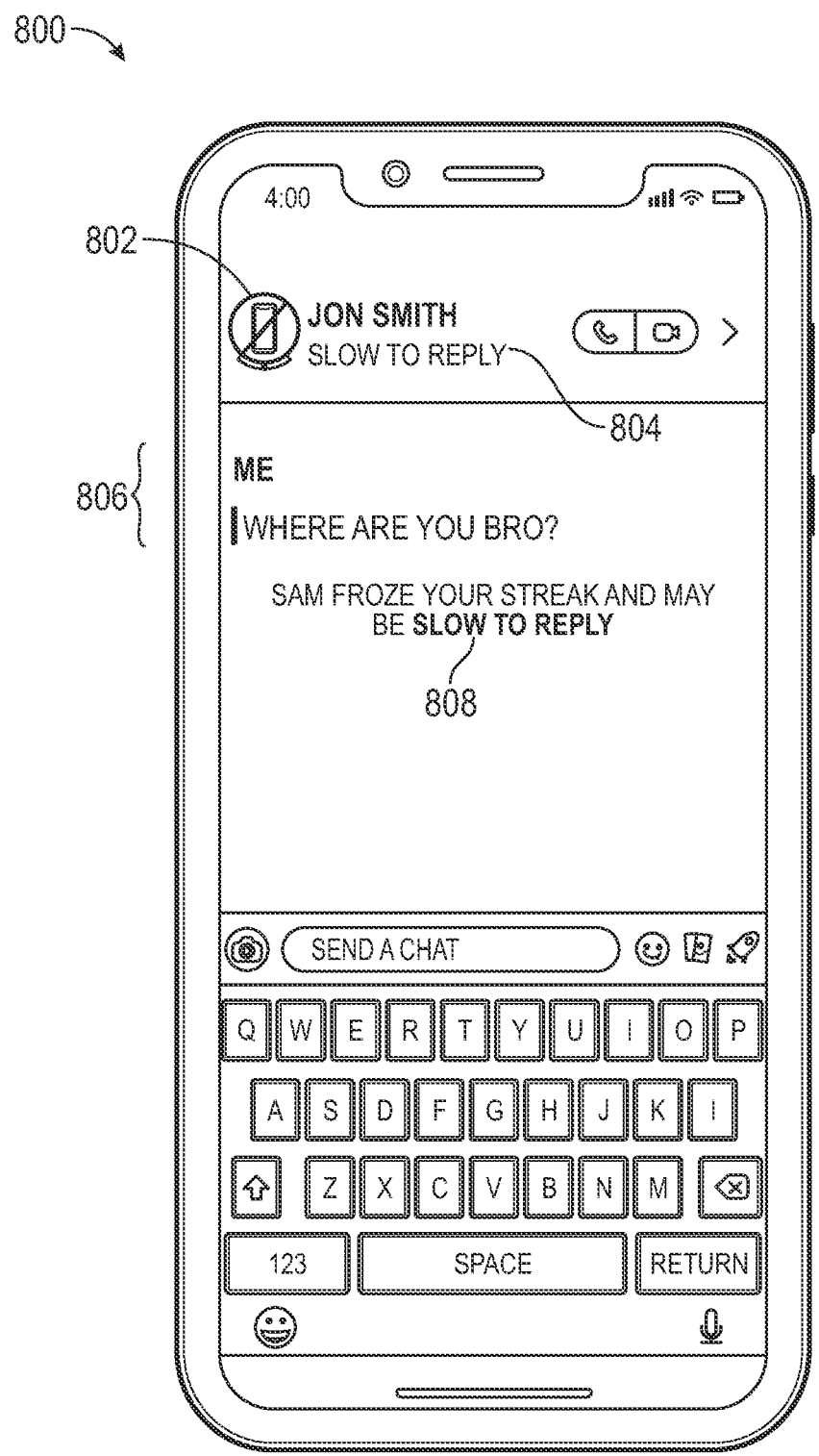
FIG. 8 illustrates a message thread interface indicating that a limited availability mode is set for a user, in accordance with some example embodiments.

FIG. 8 illustrates a message thread interface 800 indicating that a limited availability mode is set for a user, in accordance with some example embodiments. For example, in a case where the first user set the limited availability mode on the first client device 602, the messaging client application 104 running on the second client device 604 displays the message thread interface 800 with corresponding elements as shown. The message thread interface 800 includes an information link 808, as well as one or more of an avatar 802, header subtext 804 and/or a message thread 806 for indicating the limited availability mode of the first user.

In the example of FIG. 8, the avatar 802 is depicted as a device with strike-through (e.g., to indicate reduced availability of the user). In response to receiving the indication of the limited availability mode from the messaging server system 108, the messaging client application 104 may replace display of the avatar (e.g., bitmoji) set within the personal profile of the first user with the avatar 802. The messaging client application 104 is configured to replace the avatar within all or multiple interfaces of the messaging client application 104 in which the avatar of the first user is displayed, including the message thread interface 800.

The header subtext 804 is presented in a header portion of the message thread interface 800, for example, below displayed name of the first user. The header subtext 804 indicates the first user's limited availability (e.g., that the first user is slow to reply).

As noted above with respect to FIG. 6, the messaging client application 104 further provides an auto-response to message content submitted to the message thread 806 by the second user. In the example of FIG. 8, the auto-response includes an information link 808, which is selectable by the second user. In response to user selection of the information link 808, the messaging client application 104 redirects to an information screen with information on the different availability modes (e.g., as discussed further below with respect to FIG. 13).

Figure 9:
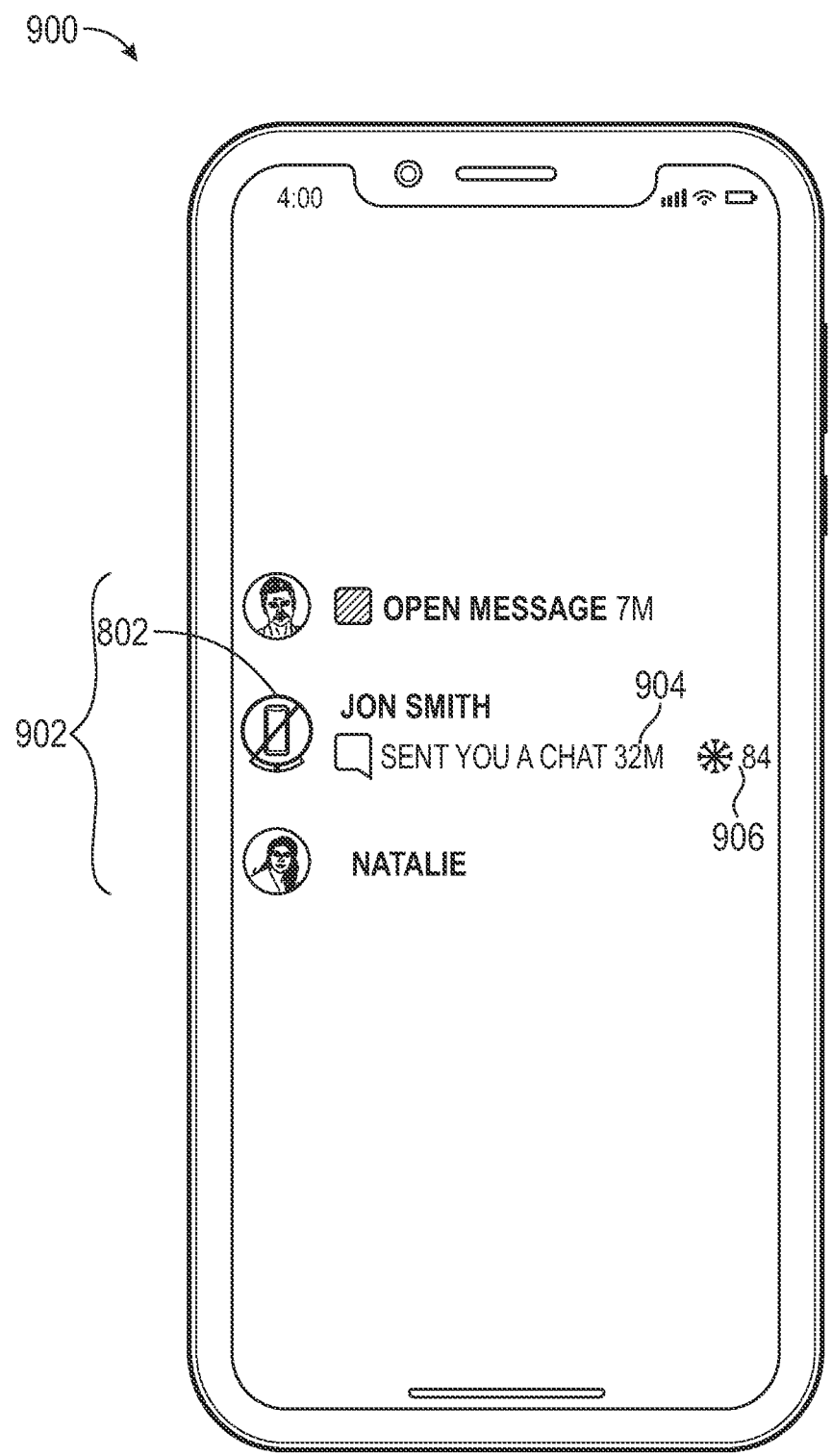
FIG. 9 illustrates a friends feed interface indicating that a reduced availability mode is set for a user, in accordance with some example embodiments.

FIG. 9 illustrates a friends feed interface 900 indicating that a reduced availability mode is set for a user, in accordance with some example embodiments. The friends feed interface 900 includes a friends list 902, including an avatar 802 (e.g., icon) and status 904 (e.g., availability of a message and/or media content items) for each listed friend.

As noted above with respect to FIG. 8, the avatar 802 is depicted as a device with strike-through to indicate reduced user availability. For example, the avatar 802 replaces the avatar (e.g., bitmoji) set within a personal profile while the reduced user availability mode is set. Moreover, the messaging client application 104 displays indication of the paused (e.g., or frozen) counter with respect to the first user via paused count indicator 906. In the example of FIG. 9, the paused count indicator 906 is depicted as a snowflake icon indicating the freezing/pausing of the paused count value (e.g., 84 days of consecutive back-and-forth messaging).

Figure 10:
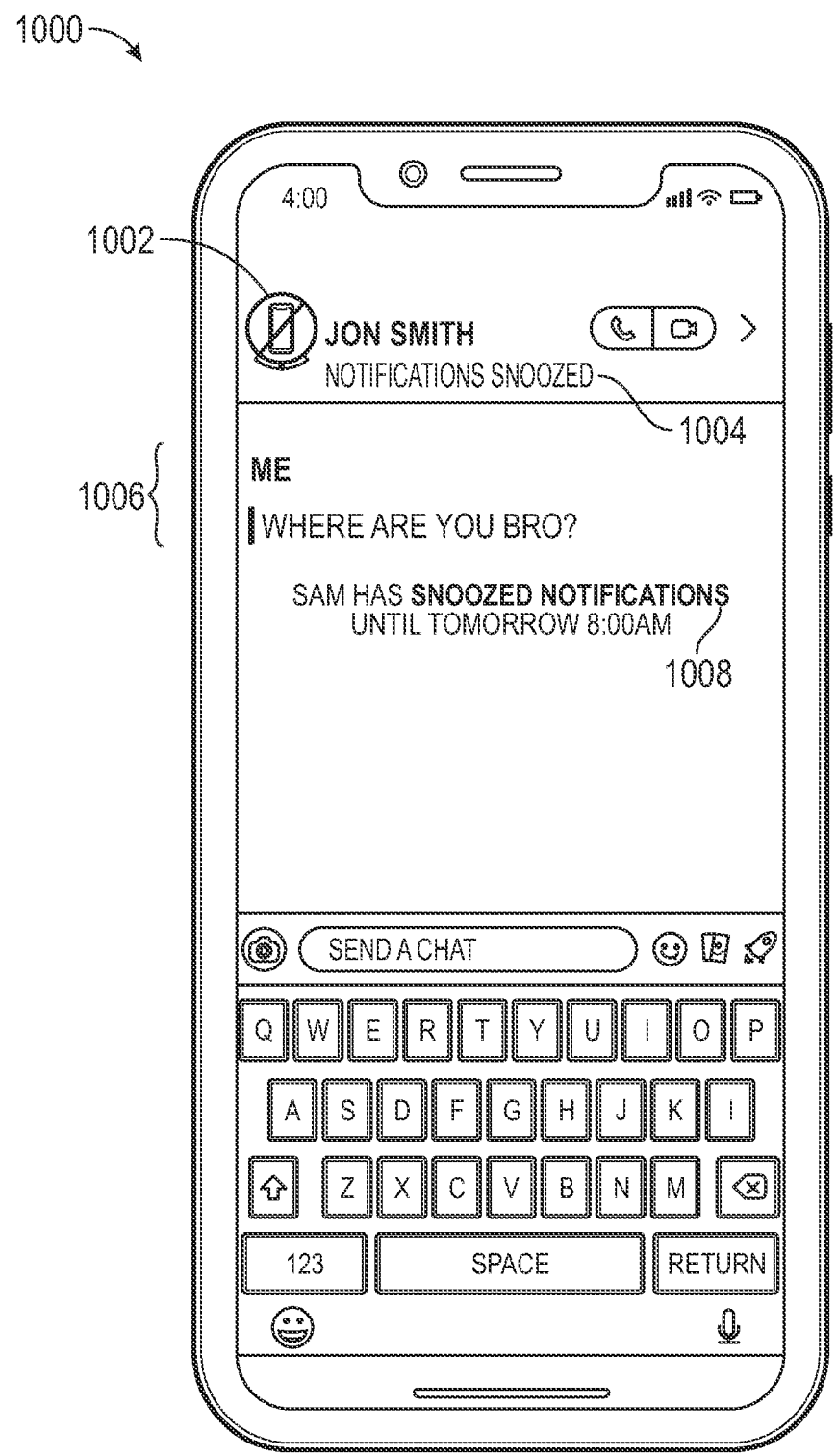
FIG. 10 illustrates a message thread interface indicating that an unavailable mode is set for a user, in accordance with some example embodiments.

FIG. 10 illustrates a message thread interface 1000 indicating that an unavailable mode is set for a user, in accordance with some example embodiments. For example, in a case where the first user set the unavailable mode on the first client device 602, the messaging client application 104 running on the second client device 604 displays the message thread interface 1000 with corresponding elements as shown. Similar to the message thread interface 800 of FIG. 8, the message thread interface 1000 includes a message thread 1006, as well as one or more of an avatar 1002, header subtext 1004 and/or an information link 1008 (e.g., as part of an auto-response). However, FIG. 10 illustrates that that the user (e.g., the first user) set the unavailable mode (e.g., rather than the limited availability mode of FIG. 8), for example by depicting different text for the header subtext 1004 and/or the information link 1008 (e.g., unavailable, snoozing, etc.).

Figure 11:
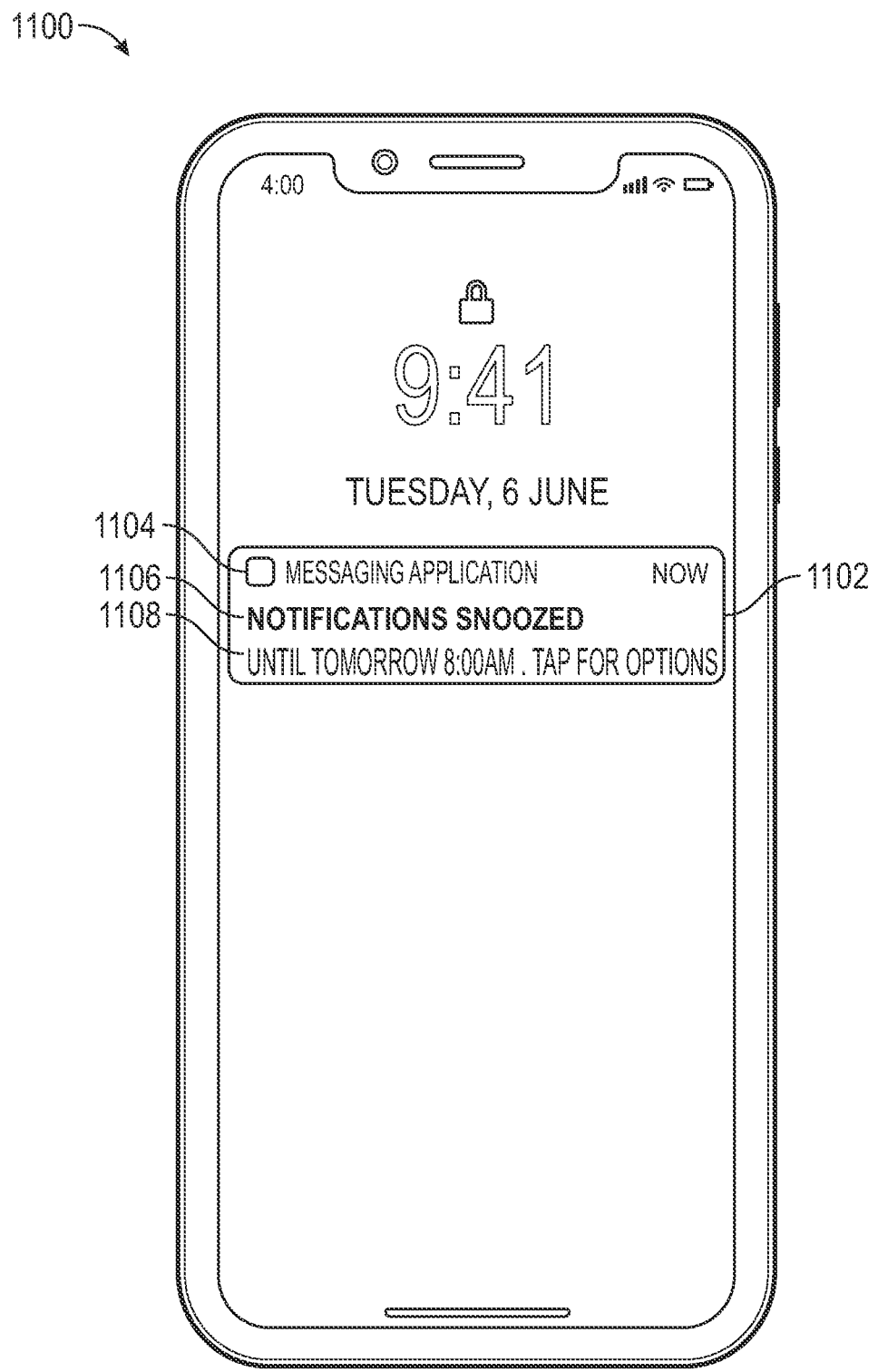
FIG. 11 illustrates a lock screen interface which includes a persistent notification that an unavailable mode is set, in accordance with some example embodiments.

FIG. 11 illustrates a lock screen interface which includes a persistent notification 1102 indicating that an unavailable mode is set, in accordance with some example embodiments. The lock screen interface 1100 corresponds to a device lock screen provided by an operating system of the client device 102. For example, a device lock screen may provide for immediate or otherwise expedited access to the client device 102, by requiring that the user perform a certain action in order to receive access (e.g., entering a password, using a certain button combination, or performing a certain gesture).

In the example of FIG. 11, the persistent notification 1102 indicates that the unavailable mode is set for the client device 102 (e.g., after previously being set by the user of the client device 102). The persistent notification 1102 includes the messaging application name 1104, text 1106 indicating that the unavailability mode is set, and a duration 1108. As noted above with respected to FIG. 6, the duration represents a time period, set by the user, for which the unavailability mode is set before automatically expiring.

In some embodiments, the persistent notification 1102 corresponds to a user-selectable link, the selection of which provides for redirecting the messaging client application 104 to the personal profile interface 700 of FIG. 7. As noted above, the personal profile interface 700 provides for the user to enable/disable the unavailable mode and/or the limited availability mode.

In some embodiments, the persistent notification 1102 is displayed on the lock screen interface 1100 on a persistent basis. For example, the persistent display may be implemented based on a persistent push notification which includes the information (e.g., icon, name of user, name of messaging client application 104) of the persistent notification 1102. The persistent push notification corresponds to a notification which is persistently pushed (e.g., based on a predefined frequency) from the messaging server system 108 to the client device 102. The operating system of the client device 102 may be configured to detect the persistently-pushed notification(s) for display on the lock screen, such that the persistent notification 1102 is continuously displayed on the lock screen interface 1100.

Moreover, the messaging server system 108 is configured to refrain from pushing other notifications (e.g., indicating new message content received from friends, status updates and the like) to the lock screen, while the persistent notification 1102 is being displayed (e.g., while the unavailable mode is set). In this manner, the end user is less likely to be distracted by lock screen notifications while the unavailable mode is set (e.g., and can continue participating in an activity).

Figure 12:
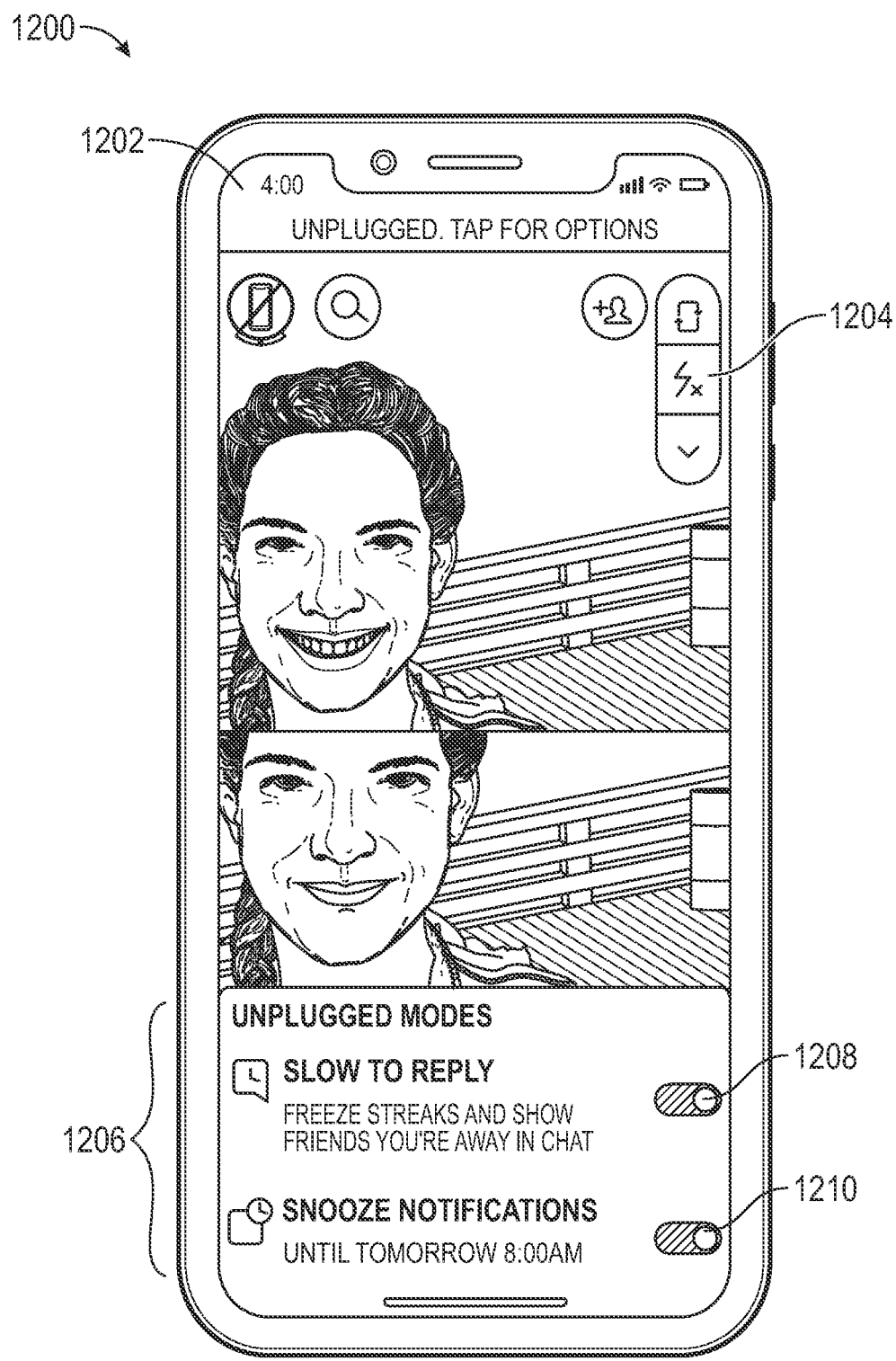
FIG. 12 illustrates a user interface with a user-selectable notification indicating an unavailable mode, in accordance with some example embodiments.

FIG. 12 illustrates a user interface 1200 with a user-selectable notification 1202 indicating an unavailable mode, in accordance with some example embodiments. For example, the user-selectable notification 1202 indicates that the unavailable mode had been previously being set by the user of the client device 102, and is still enabled. In some embodiments, the user-selectable notification 1202 appears as a bar across of a top edge of the user interface 1200. The user-selectable notification 1202 may include text indicating that the unavailable mode is set on the client device 102.

In some embodiments, selection of the user-selectable notification 1202 provides for surfacing an interface 1206. For example, the interface 1206 provides for the user to enable/disable the unavailable mode via the toggle element 1210. Moreover, the interface 1206 provides for the user to enable/disable the limited availability mode, via the toggle element 1208 (e.g., similar to that provided by the personal profile interface 700).

In the example of FIG. 12, the user interface 1200 corresponds to an interface provided within the messaging client application 104, for generating multimedia content to send with respect to messaging. The user interface 1200 may be used to capture image data (e.g., with one or more devices cameras), and may include one or more buttons 1204 for adjusting camera settings (e.g., switching between a front and rear facing camera, enabling flash, and the like). However, it should be understood that the persistent notification 1102 is not limited to this type of interface, and may be presented within multiple interfaces of the messaging client application 104.

Figure 13:
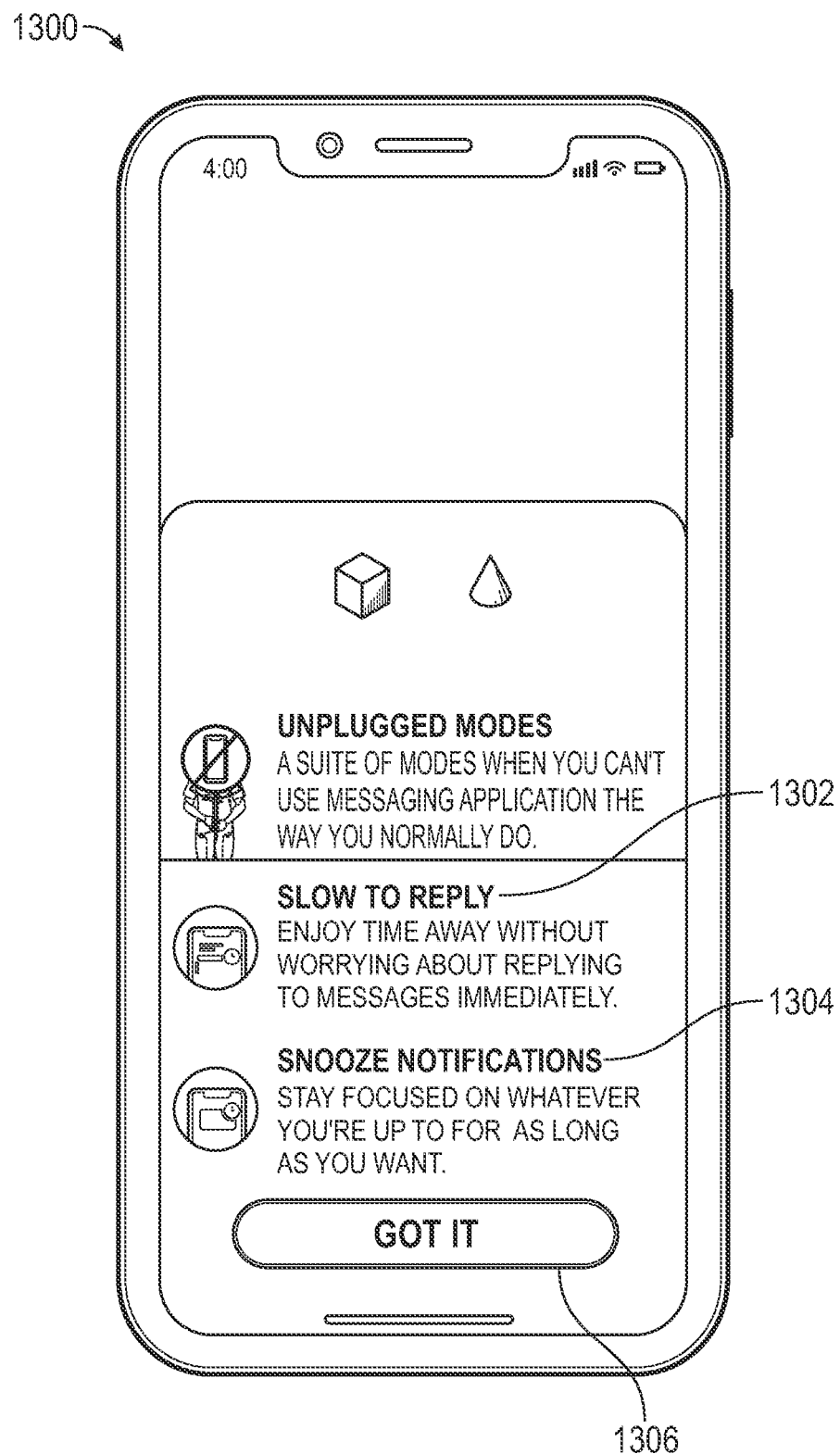
FIG. 13 illustrates an information screen that provides information for different availability modes, in accordance with one embodiment.

FIG. 13 illustrates an information screen 1300 that provides information for different availability modes, in accordance with one embodiment. As noted above, the messaging client application 104 presents the information screen 1300 in response to user selection of the information link 808 and/or the information link 1008, which correspond to respective auto-responses provided by the messaging client application 104.

The information screen 1300 includes a description 1302 for informing an end user of the unavailable mode, and a description 1304 for informing the end user of the limited availability mode. Moreover, the information screen 1300 includes a button 1306 for returning to a prior screen (e.g., message thread interface) of the messaging client application 104.

Figure 14:
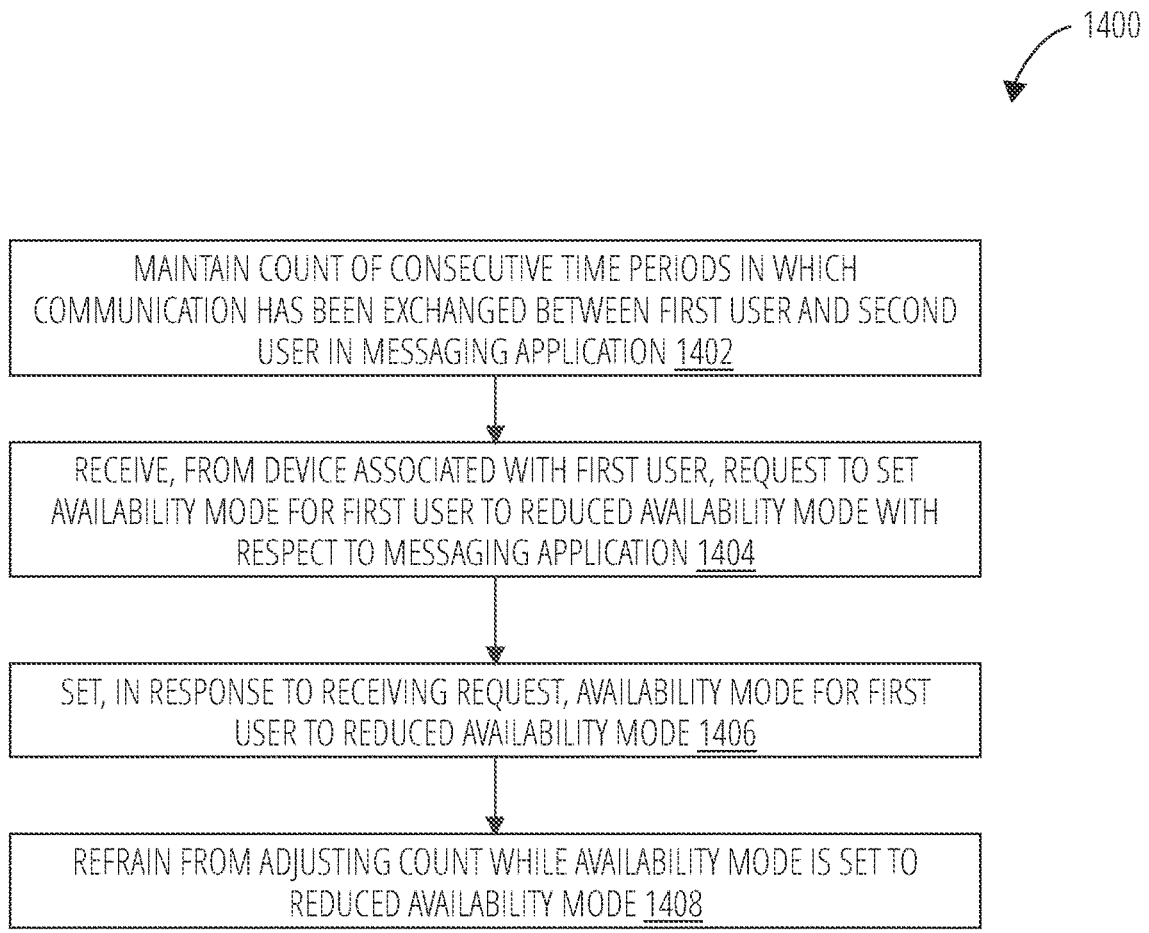
FIG. 14 is a flowchart illustrating a process for providing reduced availability modes in messaging, in accordance with some example embodiments.

FIG. 14 is a flowchart illustrating a process 1400 for providing reduced availability modes in messaging, in accordance with some example embodiments. For explanatory purposes, the process 1400 is primarily described herein with reference to the messaging server system 108 of FIG. 1. However, one or more blocks (or operations) of the process 1400 may be performed by one or more other components of the messaging server system 108, and/or by other suitable devices. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

The messaging server system 108 maintains a count of consecutive time periods in which message content has been exchanged between a first user and a second user in a messaging application (block 1402).

The messaging server system 108 receives, from a first client device 602 associated with the first user, a request to set an availability mode for the first user to a reduced availability mode with respect to the messaging application (block 1404). The messaging server system 108 may provide, prior to the receiving, for display of a user interface within a profile view of the first user, the user interface for setting the availability mode, where the receiving is based on user input provided via the user interface.

The messaging server system 108 sets, in response to receiving the request, the availability mode for the first user to the reduced availability mode (block 1406). The setting may include setting the availability mode for the first user to a limited availability mode.

Alternatively or in addition, the setting may include setting the availability mode for the first user to an unavailable mode. The messaging server system 108 may provide, to the first client device 602, a persistent notification indicating the unavailable mode, for display on a lock screen of the first client device 602. The messaging server system 108 may receive, from the first client device 602, a user-specified period of time for maintaining the unavailable mode, where the providing comprises providing the persistent notification for the user-specified period of time.

The messaging server system 108 refrains from updating the count while the availability mode is set to the reduced availability mode (block 1408). The messaging server system 108 may provide, to a second first client device 602 associated with the second user, an indication of the reduced availability mode for the first user.

The indication may provide for at least one of an avatar indicating reduced availability, text within a header of a message thread indicating reduced availability, or an auto-response within the message thread indicating reduced availability to be displayed on the second client device 604. The indication may provide for an icon indicating that the count is paused to be displayed on the second device.

Figure 15:
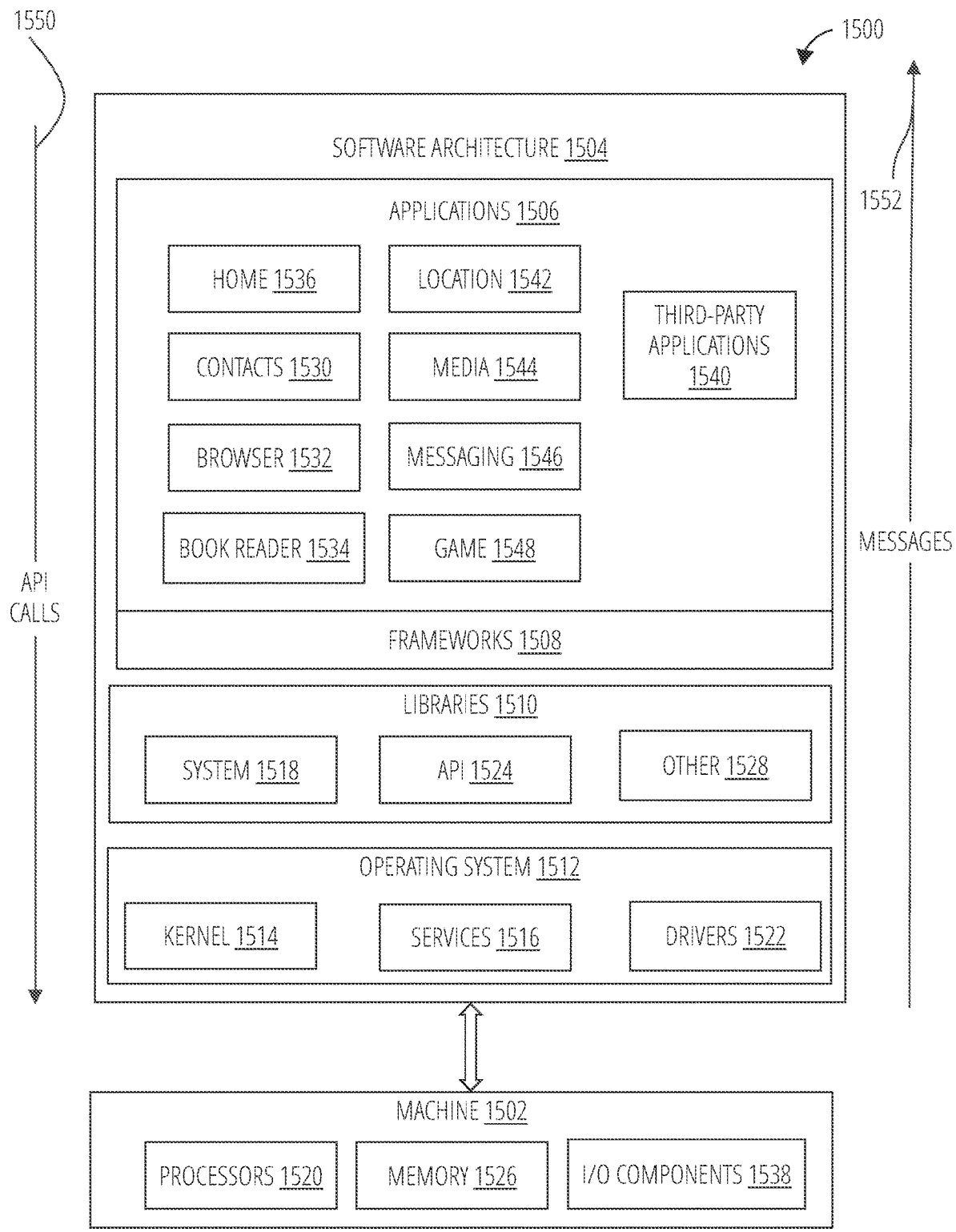
FIG. 15 is block diagram showing a software architecture within which the present disclosure may be implemented, in accordance with some example embodiments.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a high-level common infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example embodiment, the applications 1506 may include a home application 1536, a contacts application 1530, a browser application 1532, a book reader application 1534, a location application 1542, a media application 1544, a messaging application 1546 (e.g., corresponding to the messaging client application 104), a game application 1548, and a broad assortment of other applications such as third-party applications 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party applications 1540 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1540 can invoke the API calls 1550 provided by the operating system 1512 to facilitate functionality described herein.

Figure 16:
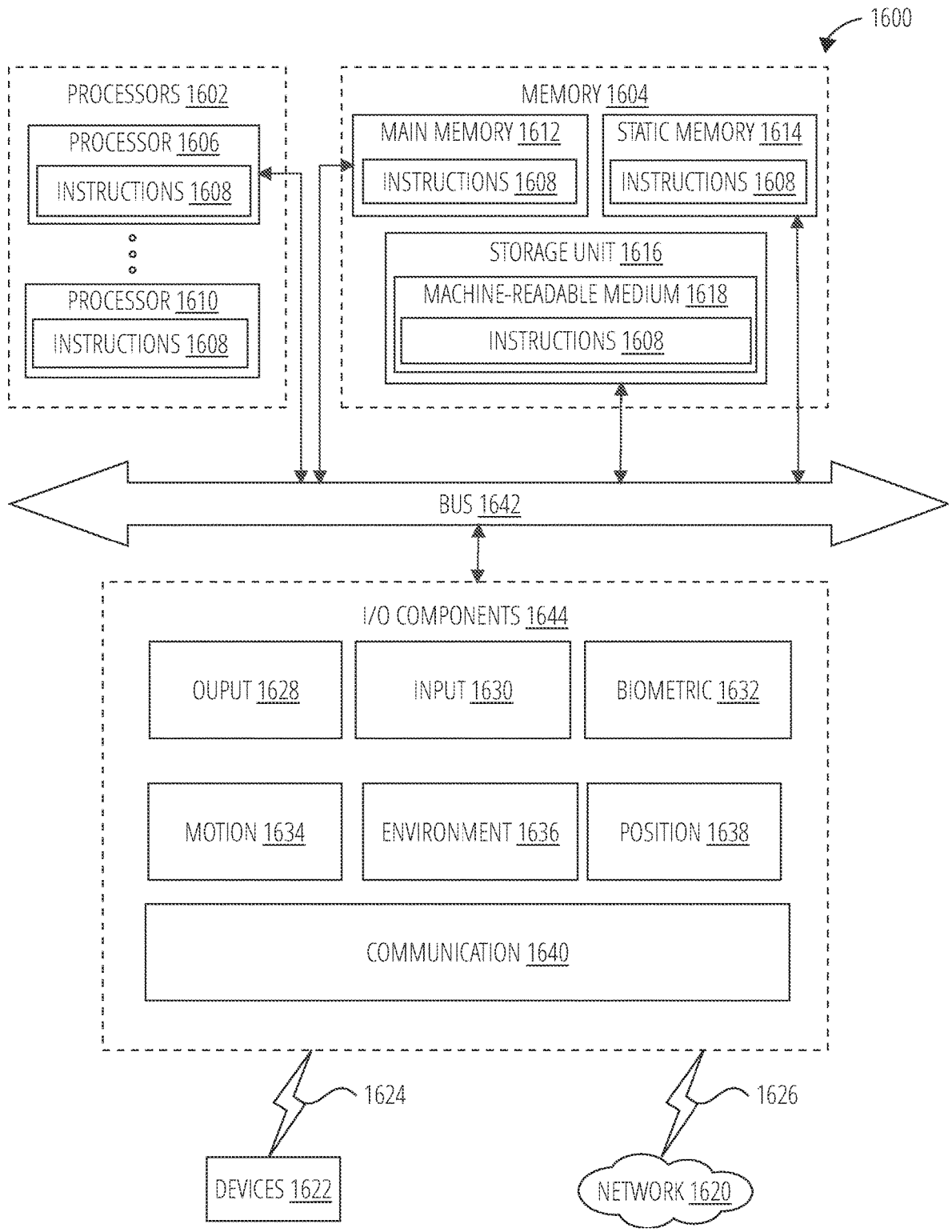
FIG. 16 is a diagrammatic representation of a machine, in the form of a computer system within which a set of instructions may be executed for causing the machine to perform any one or more of the methodologies discussed, in accordance with some example embodiments.

FIG. 16 is a diagrammatic representation of a machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein.

The machine 1600 may include processors 1602, memory 1604, and I/O components 1644, which may be configured to communicate with each other via a bus 1642. In an example embodiment, the processors 1602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1606 and a processor 1610 that execute the instructions 1608. The term "processor" is intended to include multi-core processors that may comprise two or more independent processors (sometimes referred to as "cores") that may execute instructions contemporaneously. Although FIG. 16 shows multiple processors 1602, the machine 1600 may include a single processor with a single core, a single processor with multiple cores (e.g., a multi-core processor), multiple processors with a single core, multiple processors with multiples cores, or any combination thereof.

The memory 1604 includes a main memory 1612, a static memory 1614, and a storage unit 1616, both accessible to the processors 1602 via the bus 1642. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the processors 1602 (e.g., within the processor's cache memory), or any suitable combination thereof, during execution thereof by the machine 1600.

The I/O components 1644 may include a wide variety of components to receive input, provide output, produce output, transmit information, exchange information, capture measurements, and so on. The specific I/O components 1644 that are included in a particular machine will depend on the type of machine. For example, portable machines such as mobile phones may include a touch input device or other such input mechanisms, while a headless server machine will likely not include such a touch input device. It will be appreciated that the I/O components 1644 may include many other components that are not shown in FIG. 16. In various example embodiments, the I/O components 1644 may include output components 1628 and input components 1630. The output components 1628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1644 may include biometric components 1632, motion components 1634, environmental components 1636, or position components 1638, among a wide array of other components. For example, the biometric components 1632 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1634 include acceleration sensor components (e.g., accelerometer), gravitation sensor components, rotation sensor components (e.g., gyroscope), and so forth. The environmental components 1636 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1638 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1644 further include communication components 1640 operable to couple the machine 1600 to a network 1620 or devices 1622 via a coupling 1626 and a coupling 1624, respectively. For example, the communication components 1640 may include a network interface component or another suitable device to interface with the network 1620. In further examples, the communication components 1640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1622 may be another machine or any of a wide variety of peripheral devices (e.g., a peripheral device coupled via a USB).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1640, such as location via Internet Protocol (IP) geolocation, location via Wi-Fi® signal triangulation, location via detecting an NFC beacon signal that may indicate a particular location, and so forth.

The various memories (e.g., memory 1604, main memory 1612, static memory 1614, and/or memory of the processors 1602) and/or storage unit 1616 may store one or more sets of instructions and data structures (e.g., software) embodying or used by any one or more of the methodologies or functions described herein. These instructions (e.g., the instructions 1608), when executed by processors 1602, cause various operations to implement the disclosed embodiments.

The instructions 1608 may be transmitted or received over the network 1620, using a transmission medium, via a network interface device (e.g., a network interface component included in the communication components 1640) and using any one of a number of well-known transfer protocols (e.g., hypertext transfer protocol (HTTP)). Similarly, the instructions 1608 may be transmitted or received using a transmission medium via the coupling 1624 (e.g., a peer-to-peer coupling) to the devices 1622.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
maintaining a count of consecutive days of back-and-forth messaging between a first user and a second user;
receiving, from a first device associated with the first user, a request to set an availability mode for the first user to a reduced availability mode with respect to messaging; and
in response to receiving the request,
setting the availability mode for the first user to the reduced availability mode,
pausing the count, and
causing, on a second device associated with the second user, display of a notification of the reduced availability mode for the first user, and display of an icon which is separate from the count and which indicates that the count has been paused,
wherein the notification comprises an avatar indicating reduced availability.

2. The method of claim 1, wherein the reduced availability mode corresponds to a limited availability mode for the first user.

3. The method of claim 1, wherein the reduced availability mode corresponds to an unavailable mode for the first user.

4. The method of claim 3, further comprising:
providing, to the first device, a persistent notification indicating the unavailable mode, for display on a lock screen of the first device.

5. The method of claim 4, further comprising:
receiving, from the first device, a user-specified period of time for maintaining the unavailable mode,
wherein the providing comprises providing the persistent notification for the user-specified period of time.

6. The method of claim 1, wherein the notification further comprises at least one of text within a header of a message thread indicating reduced availability, or an auto-response within the message thread indicating reduced availability to be displayed on the second device.

7. The method of claim 1, further comprising:
providing, prior to the receiving, for display of a user interface within a profile view of the first user, the user interface for setting the availability mode,
wherein the receiving is based on user input provided via the user interface.

8. A system comprising:
at least one processor; and
a memory storing instructions that, when executed by the at least one processor, cause the at least one processor to perform operations comprising:
maintaining a count of consecutive days of back-and-forth messaging between a first user and a second user;
receiving, from a first device associated with the first user, a request to set an availability mode for the first user to a reduced availability mode with respect to messaging; and
in response to receiving the request,
setting the availability mode for the first user to the reduced availability mode,
pausing the count, and
causing, on a second device associated with the second user, display of a notification of the reduced availability mode for the first user, and display of an icon which is separate from the count and which indicates that the count has been paused,
wherein the notification comprises an avatar indicating reduced availability.

9. The system of claim 8, wherein the reduced availability mode corresponds to a limited availability mode for the first user.

10. The system of claim 8, wherein the reduced availability mode corresponds to an unavailable mode for the first user.

11. The system of claim 10, further comprising:
providing, to the first device, a persistent notification indicating the unavailable mode, for display on a lock screen of the first device.

12. The system of claim 11, further comprising:
receiving, from the first device, a user-specified period of time for maintaining the unavailable mode,
wherein the providing comprises providing the persistent notification for the user-specified period of time.

13. The system of claim 8, wherein the notification further comprises at least one of text within a header of a message thread indicating reduced availability, or an auto-response within the message thread indicating reduced availability to be displayed on the second device.

14. The system of claim 8, further comprising:
providing, prior to the receiving, for display of a user interface within a profile view of the first user, the user interface for setting the availability mode,
wherein the receiving is based on user input provided via the user interface.

15. A non-transitory computer-readable storage medium storing instructions that, when executed by at least one processor, cause the at least one processor to perform operations comprising:
maintaining a count of consecutive days of back-and-forth messaging between a first user and a second user;
receiving, from a first device associated with the first user, a request to set an availability mode for the first user to a reduced availability mode with respect to messaging; and
in response to receiving the request,
setting the availability mode for the first user to the reduced availability mode,
pausing the count, and
causing, on a second device associated with the second user, display of a notification of the reduced availability mode for the first user, and display of an icon which is separate from the count and which indicates that the count has been paused,
wherein the notification comprises an avatar indicating reduced availability.

16. The non-transitory computer-readable storage medium of claim 15, wherein the reduced availability mode corresponds to a limited availability mode for the first user.

17. The non-transitory computer-readable storage medium of claim 15, wherein the reduced availability mode corresponds to an unavailable mode for the first user.

18. The non-transitory computer-readable storage medium of claim 17, further comprising:
providing, to the first device, a persistent notification indicating the unavailable mode, for display on a lock screen of the first device.

19. The non-transitory computer-readable storage medium of claim 18, further comprising:
receiving, from the first device, a user-specified period of time for maintaining the unavailable mode,
wherein the providing comprises providing the persistent notification for the user-specified period of time.

20. The non-transitory computer-readable storage medium of claim 15, wherein the notification further comprises at least one of text within a header of a message thread indicating reduced availability, or an auto-response within the message thread indicating reduced availability to be displayed on the second device.

\* \* \* \* \*